(12) United States Patent
Randazzo et al.

(10) Patent No.: US 11,525,090 B2
(45) Date of Patent: Dec. 13, 2022

(54) PROCESS FOR DEPOLYMERIZING PLASTIC MATERIAL FOR THE PRODUCTION OF HYDROCARBONS, AND A PLANT THEREFOR

(71) Applicant: PROIL S.r.l., Rome (IT)

(72) Inventors: Filippo Randazzo, San Bonifacio (IT); Antonio Naviglio, Rome (IT)

(73) Assignee: PROIL S.R.L., Rome (IT)

( * ) Notice: Subject to any disclaimer, the term of this patent is extended or adjusted under 35 U.S.C. 154(b) by 0 days.

(21) Appl. No.: 17/286,455

(22) PCT Filed: Oct. 23, 2019

(86) PCT No.: PCT/IB2019/059070
§ 371 (c)(1),
(2) Date: Apr. 17, 2021

(87) PCT Pub. No.: WO2020/084522
PCT Pub. Date: Apr. 30, 2020

(65) Prior Publication Data
US 2021/0388271 A1 Dec. 16, 2021

(30) Foreign Application Priority Data
Oct. 25, 2018 (IT) .......................... 102018000009798

(51) Int. Cl.
*C10B 53/07* (2006.01)
*C10B 47/26* (2006.01)
*C10B 47/44* (2006.01)
*C10B 49/02* (2006.01)

(52) U.S. Cl.
CPC .............. *C10B 53/07* (2013.01); *C10B 47/26* (2013.01); *C10B 47/44* (2013.01); *C10B 49/02* (2013.01)

(58) Field of Classification Search
USPC .......................................................... 585/241
See application file for complete search history.

(56) References Cited

U.S. PATENT DOCUMENTS

| | | | |
|---|---|---|---|
| 2012/0065440 A1* | 3/2012 | Fraczak | C10G 1/10 422/184.1 |
| 2012/0097518 A1* | 4/2012 | Fraczak | C10B 49/14 201/20 |
| 2012/0116142 A1* | 5/2012 | Handerek | B01J 4/007 422/198 |
| 2015/0083572 A1* | 3/2015 | Handerek | C10G 1/10 201/11 |
| 2015/0184079 A1* | 7/2015 | Riedewald | C10B 49/14 201/25 |
| 2017/0283714 A1* | 10/2017 | Combs | C10G 11/14 |
| 2018/0010049 A1* | 1/2018 | Tenore | C10B 53/07 |

FOREIGN PATENT DOCUMENTS

| | | |
|---|---|---|
| DE | 31 46 194 A1 | 5/1983 |
| WO | 2005/028593 A1 | 3/2005 |
| WO | 2010/049824 A2 | 5/2010 |

OTHER PUBLICATIONS

Niaounakis, Michael, "International Search Report and Written Opinion of the International Searching Authority for PCT/IB2019/059070," European Patent Office, dated Dec. 6, 2019.

* cited by examiner

*Primary Examiner* — Nina Bhat
(74) *Attorney, Agent, or Firm* — Florek & Endres PLLC

(57) ABSTRACT

A process for the depolymerization of waste plastic material and a reactor suitable for the depolymerization of waste plastic materials in said process.

21 Claims, 9 Drawing Sheets

PROCESS FOR DEPOLYMERIZING PLASTIC MATERIAL FOR THE PRODUCTION OF HYDROCARBONS, AND A PLANT THEREFOR

The present invention relates to a process for the depolymerization of waste plastic material for the production of hydrocarbons and a plant suitable for the depolymerization of plastic material in said process.

Within the scope of the present invention, "waste plastic material" refers to materials which remain as a residue after primary use and which at least partially contain polymeric substances of a synthetic origin, for example deriving from the petrochemical industry, or consisting of these substances. Waste plastic materials can derive from urban or industrial waste (such as processing or finishing residues of products comprising parts in plastic material), they can be of a homogeneous or non-homogeneous chemical nature and can be recyclable or, preferably, not further usable in common recycling processes.

Waste plastic materials have a negative impact that affects the environment and the health of living beings and are one of the most widespread causes of pollution, also with a negative effect on various human activities which, in principle, should be independent of "supply chain" of plastic materials, such as fishing or tourism. The recycling of plastic materials coming from domestic and industrial users allows at least a part of these plastics to be reintroduced into the production cycle.

Although desirable, it is not in fact realistic to expect a rapid and drastic reduction in the demand for plastic material destined for various applications in the near future, nor is it conceivable that plastic recycling can reach 100%. The mechanical recycling of plastic materials, in fact, produces substances with lower-quality characteristics and the recycling process, with the progressive "degradation" of the products, cannot be carried out ad infinitum. There is a limit, beyond which only the energy power of plastic waste (of poor quality at the end of recycling) can be used today. It is very important that this waste can also be converted into useful material, i.e. that this use of energy has an optimal yield and that the final residue of plastic waste is transformed into an inert substance, which occupies a limited volume.

Urban waste is a mixture of different substances, which vary according to the site of origin and over time. One of the "streams" of urban waste consists specifically of a mixture of plastic materials and can include different polymers including polyethylene terephthalate (PET), polystyrene, polyvinyl chloride (PVC), polypropylene (PP), low-density polyethylene (LDPE) and high-density polyethylene (HDPE).

To date, a significant part of these plastic materials, in particular for urban waste, cannot be recycled and is used as a source of thermal energy in energy-intensive plants such as incinerators, with a very low yield, eliminated in landfills or, in the worst case, dispersed in the environment polluting terrestrial and marine environments.

In most countries, especially in recent years, the need for recycling plastic is perceived as being extremely important and urgent. Numerous initiatives relating to the recycling and recovery of plastic materials have therefore arisen which, in different shapes and sizes, are also income generators.

In more advanced countries, the plastic fraction of urban waste with a residual and recyclable value is mainly handled with automatic machines that carry out a mechanical recycling and have the purpose of recovering, as far as possible, the fractions of plastic waste having even a minimum market value. In particular, in Italy, most of the plastic waste coming from urban waste is managed by the CSS (Centri di Selezione Spinta) (Forced Waste Selection Centres) managed by the COREPLA supply chain consortium, part of the wider CONAI Consortium. Currently, COREPLA recovers and recycles about 60% of the urban plastic waste that is withdrawn nationally (mainly consisting of packaging material). In the plants controlled by COREPLA, recovery and recycling reach the limits of feasibility, as the activity of recovering and recycling urban waste containing plastic is no longer economically sustainable beyond the indicative limit of 60%.

As a result, about 40% of the original urban plastic waste becomes "useless or even harmful" waste, destined, as mentioned above, to be eliminated, for example in landfills, or to be burnt, for example in incinerators (in Italy, this is about 400,000 tons/year, over approximately 1,000,000 tons/year of plastic waste deriving from urban waste, managed by the Consortium).

This "useless and harmful" material is, in a simplified way but for ease of understanding, herein called PLASMIX; its average composition is shown in Table 1.

TABLE 1

| Element | % of the total weight of PLASMIX | |
|---|---|---|
| | MIN | MAX |
| PET | 3.00% | 8.00% |
| PP | 25.00% | 35.00% |
| PE | 30.00% | 45.00% |
| PVC | 1.00% | 4.00% |
| PS | 5.00% | 15.00% |
| Metals | 2.00% | 5.00% |
| Paper and cardboard | 3.00% | 5.00% |
| Other polymers | 1.00% | 5.00% |
| Humidity | 1.00% | 20.00% |

This material has no economic value on the market and in fact, if dispersed, constitutes a serious environmental problem, degrading the territory in which it is deposited and decreasing its value for other purposes, such as tourism.

In most countries of the world, plastic waste from urban waste is recycled to the extent in which the recycled material finds a subsequent applicability. Less than 10% of plastic waste is used in incinerators, where only the calorific value is exploited. The use of a fraction of plastic waste (or plastic waste as such) as a fuel in incinerators, however, has a very low overall efficiency, taking into account the heat required for also heating the inert materials charged and subsequently discharged from the incinerators or eliminating the water from the organic flows discharged into the same, with extremely high costs (also influenced by the strict rules on gaseous emissions, when existing and applied). Furthermore, the transfer of waste to incinerators on roads and railways causes traffic problems and wear of the infrastructures, in addition to the costs and pollution associated with the transportation itself.

Incinerators, probably advantageous at the beginning of industrial development, above all due to the reduction of waste volumes and neutralization of potentially hazardous organic waste, are now outdated compared to other technological solutions, representing an extremely expensive technological solution and, compared to others, even anachronistic.

It would also be advantageous, on the other hand, to have fuel oil (similar to Diesel fuel) to at least partially replace fuel oil of a mineral origin, i.e. produced from petroleum.

The transformation of waste plastic materials, particularly those no longer recyclable, into useful materials such as mixtures of similar hydrocarbons and which can replace fuel oil, would have the following advantages:

environmental (the dispersion in the environment of a worthless plastic waste, which must not be disposed of with a relative impact on the environment also in terms of emissions, is reduced or eliminated);

sanitary (the potential contamination of water and food due to the dispersion of plastic materials in the environment is avoided);

economic (the disposal of plastic materials is avoided and the costs of importing and producing Diesel fuel are reduced, besides producing employment and profits through a self-financed activity, i.e. substantially without costs for the supply of raw materials, and eco-friendly).

The technologies currently available for the recovery of waste plastic materials through depolymerization, in particular thermal, however, have a generally unsatisfactory yield. The compositions of the hydrocarbon mixtures obtained by current technologies which directly treat plastic waste, in fact, need to be further processed in the refinery as they consist of mixtures of hydrocarbons with a time-varying composition and not completely chemically stabilized.

An objective of the present invention is to provide a process for the thermal depolymerization of waste plastic material substantially without the drawbacks of the methods illustrated above.

The present invention relates to a process for the thermal depolymerization of waste plastic material, wherein said process comprises the following steps:

i. charging a mixture comprising or essentially consisting of waste plastic materials in an oxygen-free atmosphere into a feeding system comprising at least one screw extruder (1) which is heated, optionally through the passage of molten salts in a suitable jacket (1a) positioned on the outside of the extrusion chamber, at a temperature which is such that the material exiting from the extruder is at a temperature ranging from 150 to 180° C.;

ii. charging the plastic material coming from the extruder of the previous step directly into at least one reactor (2), in which a liquid bath of polymeric material is formed and depolymerization takes place with the formation of a gaseous effluent, wherein the area available in the reactor (2) for said gaseous effluent above the liquid bath has a volume lower than 20% of the total volume, preferably lower than 15% of the total volume of the reactor, in order to reduce the residence time of the gas produced within the reactor as much as possible, and said reactor (2) is heated to a temperature ranging from about 300 to about 400° C. by means of a flow of molten salts in a jacket external to the body of the reactor, connected to a system for transporting, heating and storing the molten salts (3) and is provided with a screw conveyor (6) connected to the base of the reactor (2) and having the discharge head positioned higher than the level of the liquid bath present inside the reactor, for eliminating the solid residue formed following depolymerization.

The present invention also relates to a reactor (2) having a cylindrical section with a vertical axis, having a mixer (7) with a gearmotor installed in the axis of the reactor, wherein the interior of said reactor (2) comprises a lower area that can be used for the formation of a polymeric liquid bath and an upper area which can receive a gaseous effluent deriving from the depolymerization of said polymeric liquid bath and having a volume lower than 20% of the total volume of the interior of the reactor (2), preferably lower than 15% of the total volume of the reactor, in order to reduce the residence time of the gaseous effluent produced inside the reactor as much as possible, a screw conveyor (6) connected to the base of the reactor (2) and having the discharge head positioned higher than the level of the polymeric liquid bath present inside the reactor, and a jacket (5) for heating by means of molten salts outside the body of the reactor, connected to a system (3) for the transportation, heating and storage of the molten salts (3).

The invention will be described hereunder with reference to non-limiting examples, provided for purely explanatory purposes, and with reference to figures that illustrate different aspects and embodiments of the invention.

Figure 1:
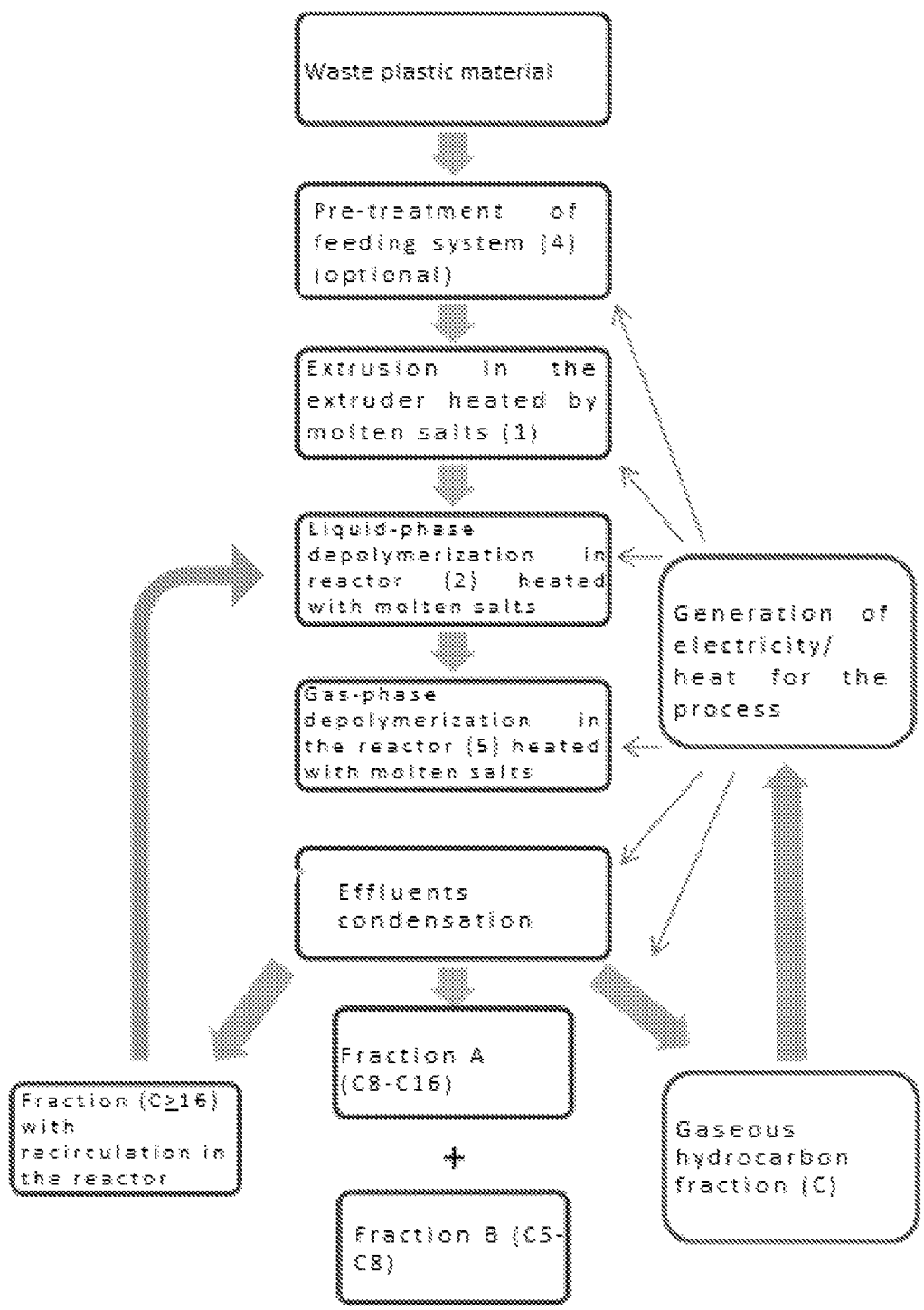
FIG. 1 shows a general block scheme of the process according to the invention.
Figure 2:
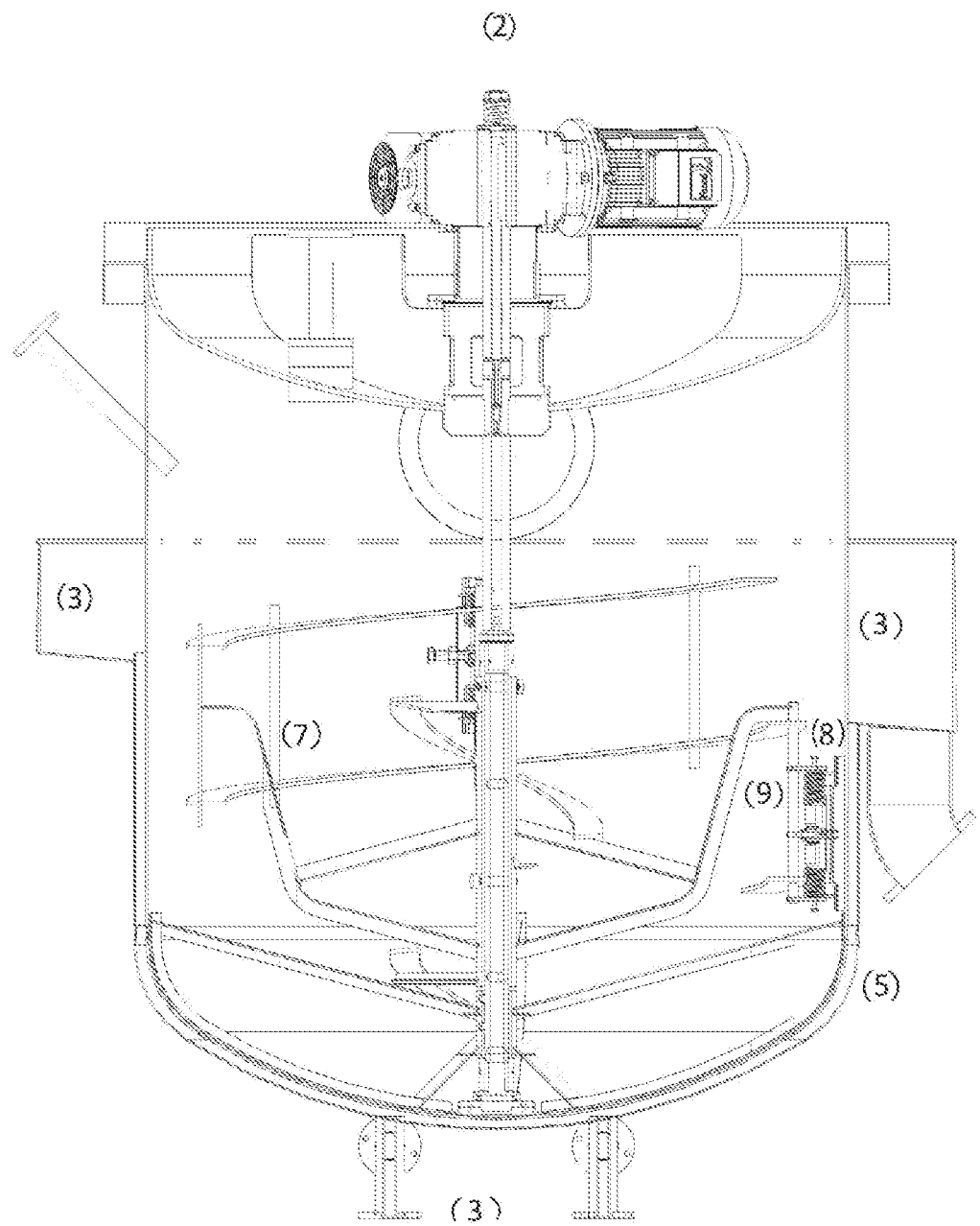
FIG. 2 shows a scheme of the depolymerization reactor (2) according to the invention.
Figure 2A:
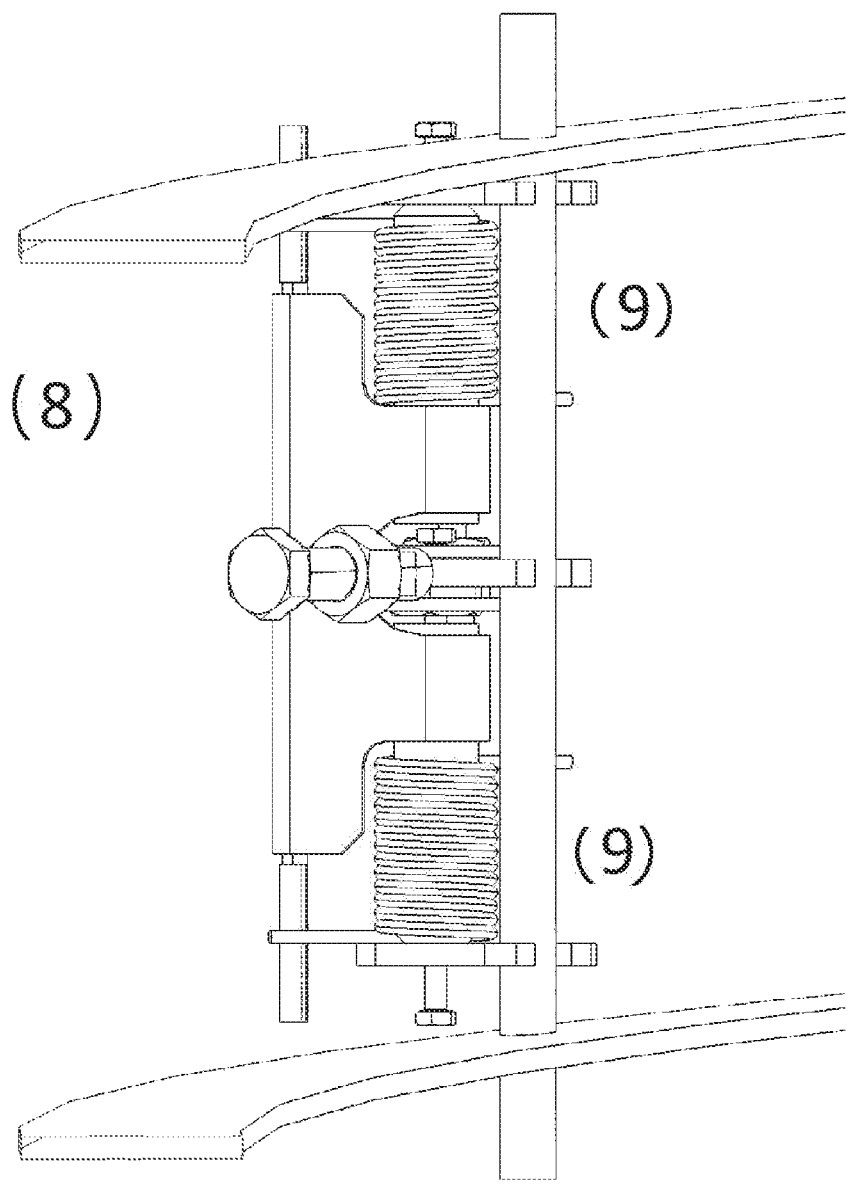
FIG. 2a shows a scheme of the scraper present in the depolymerization reactor according to the present invention.
Figure 2B:
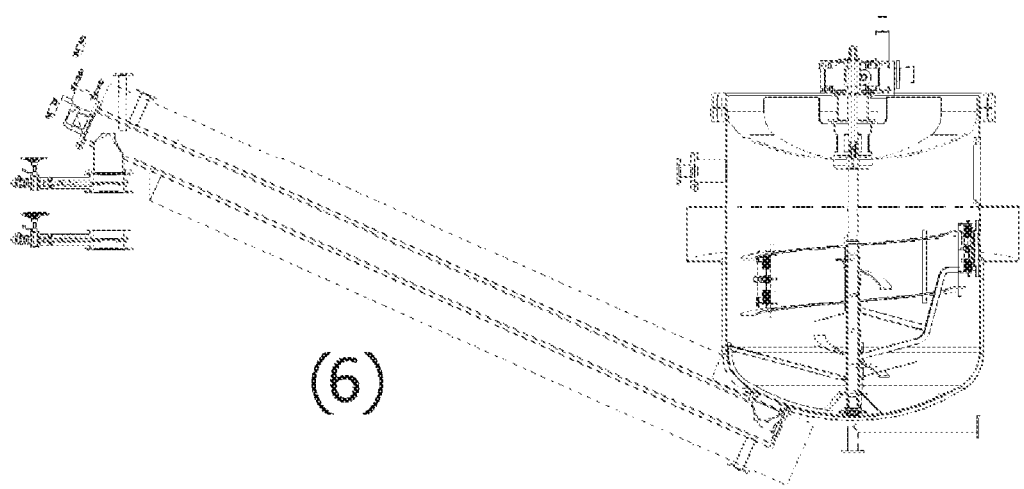
FIG. 2b shows a scheme of the depolymerization reactor with a discharge system of the solids (6) that can be used in the process according to the present invention.

Unless otherwise specified, within the scope of the present invention, the percentages and quantities of a component in a mixture refer to the weight of said component with respect to the total weight of the mixture.

Unless otherwise specified, within the scope of the present invention, the indication that a composition "comprises" one or more components or substances means that other components or substances may be present in addition to that, or those, specifically indicated.

Unless otherwise specified, within the scope of the present invention, a range of values indicated for a quantity, for example the weight content of a component, includes the lower limit and the upper limit of the range. By way of example, if the weight or volume content of a component A is indicated as "from X to Y", wherein X and Y are numerical values, A may be X or Y or any of the intermediate values.

Unless otherwise specified, within the scope of the present invention the expression "about" indicates the possibility that a given quantity (for example a temperature or a pressure) can have values that deviate slightly from the value indicated, for example by more or less some percentage points, depending on the actual composition of the waste treated and the final mixture of hydrocarbons to be produced. The technology of the present invention is the result of studies and experiments that have allowed, among other things, a process to be identified in which the main product of the transformation of mixtures of "waste" plastic material is a liquid fuel similar to commercial gas oil.

Within the scope of the present invention, the mixtures of hydrocarbons comparable to Diesel fuel, gasoline or gas, have been conventionally differentiated referring to the number of carbon atoms prevalently found in the molecules comprised in said mixtures.

The process of the present invention is suitable for other applications perfectly consistent with the production of liquid and possibly gaseous hydrocarbons, to be used, for example, for the production of ethylene which, within the context of a full application of a circular economy, can be re-used for the production of "virgin" plastic materials.

The plastic waste that can be fed to the process according to the present invention can have different compositions and origins. In particular, the mixture of heterogeneous plastic waste can be used (by way of non-limiting example, PLASMIX), previously described and generated in the high-efficiency recycling lines of the plastic fraction of urban waste collection, and also a mixture of plastic residues generated by moulding or other industrial processes.

The inventors have in fact surprisingly found that it is possible to give an adequate economic value to "exhausted" plastic waste, which must be removed after its use and, possibly, after recycling.

The process according to the present invention can also comprise a pre-treatment step, preferably present when the composition of the raw material, i.e. waste plastic materials, does not allow feeding directly to the "hot" part of the process, based on depolymerization, i.e. to step ii. of the process.

It is generally preferable to provide a pre-treatment as the first step of the complete process, when the composition of the plastic materials being fed is not known or changes over time, as in the case in which the incoming material is a waste product/reject, which has a typically variable origin and composition. Also in the case of plastic materials suitable, from a chemical point of view, for directly feeding the depolymerizer, a simplified pre-treatment can be advantageous, which, by way of non-limiting example, can consist of a mechanical treatment for adapting and standardizing the dimensions of the plastic materials being fed.

In the feed material, especially if generated from an uncontrollable waste (PLASMIX or the like), minor streams of substances not depolymerizable through the process according to the present invention may also be present, which must therefore be eliminated in advance, unless they are used for feeding other waste recovery processes. These are, for example, metallic materials, paper, polymers which, under heat, generate gases such as PET or PVC and polyurethane (each of these polymers must preferably be present in an amount of less than 3% by weight in the waste plastic material being fed to the reactor of the process according to the invention).

Furthermore, the pre-treatment step can comprise, by way of non-limiting example:

Separation and recovery of recyclable fractions (glass, metal, paper, cardboard)
Control of the shape parameters;
Reduction/control of the humidity;
Elimination of chemical components that negatively affect step ii. of the "hot" process.

Step ii. of the process according to the present invention is a high-temperature thermal depolymerization step in the absence of oxygen, of complex polymer chains, present in the waste plastic materials to be treated.

In the presence of oxygen, a local combustion would be immediately triggered until the comburent is exhausted. Possible inlet points of oxygen would give rise to localized heating not acceptable from the point of view of safety.

The "hot" part of the process relates to a separate and more complex system compared to pre-treatment machines, in which extremely advanced technological solutions have been developed and applied. In this section, the controlled depolymerization takes place and the special technology used allows complete autonomy, from the point of view of energy consumption, both in the pre-treatment section and in the depolymerization section.

Within the context of the present invention, absence or substantial absence of oxygen refers to an environment which does not contain oxygen, i.e. the amount of oxygen possibly present is below the values detectable by means of the analytical techniques that can be used in the case in question and known to persons skilled in the art.

The oxygen actually present is zero, as the oxygen, if present, burns, causing localized combustion. There should therefore be no infiltrations of oxygen as, otherwise, the localized combustion generates undesired and potentially dangerous local overheating.

A non-limiting example of the composition of the material fed, after pre-treatment, to step ii. of the process according to the present invention, i.e. to the "hot" phase, that is thermal depolymerization, is indicated in Table 2 below (unit=% by weight):

| Component | MIN | MAX |
|---|---|---|
| PET | 0.00% | 4.00% |
| PP and/or PE | 75.00% | 100.00% |
| PVC | 0.00% | 3.00% |
| PS | 0.00% | 20.00% |
| Metals | 0.00% | 1.00% |
| Paper and cardboard | 0.00% | 1.00% |
| Other polymers | 0.00% | 1.00% |
| Humidity | 0.00% | 1.00% |

From a kilogram of pure incoming polymeric material, the following gross output can be obtained (production extensively tested experimentally; the data are subject to variation, also depending on the characteristics of the material to be treated and the management modes of the plant):

662 g of liquid fuel (Diesel-like, specific weight <0.85 kg/dm$^3$)
86 g of char (coal powder)
170 g of lighter liquid fuel (gasoline-like)
82 g of gaseous fuel.

In a treatment plant of "not further recyclable plastic waste" (as in the case of PLASMIX), an additional 20-30 g of inert material can be present in the inlet and recovered in the solid waste, depending on the raw material.

The energy consumption of the process according to the present invention (which, indicatively but not exclusively, is equal to 0.26 kWh of electricity+0.6 kWh of thermal energy for each kilogram of material processed in the case of PLASMIX) is completely satisfied by the use of the lighter hydrocarbon fractions (fuels) produced by the process itself, for the generation of electricity and thermal energy, making the process practically exempt from any need for external energy supply.

The main product of the process according to an embodiment of the present invention is liquid fuel which can be sold as a fuel oil or used for the functioning of vey-high-efficiency Diesel-electric generators.

Liquid fuel (totally stable) can be easily stored and transported, as it is liquid at room temperature and, due to its flash point, the operating costs are very low.

Other possible uses of the liquid fuel obtained with the process according to the present invention and with reference to the application already specified, are the feeding of ships, such as fleets of fishing boats, or also the production of Diesel oil for motor vehicles (possibly after mixing with mineral Diesel oil, to increase its density). Among the numerous advantages, the liquid fuel that can be obtained by means of the process of the present invention is practically free of sulfur, i.e. the content of sulfur and/or sulfur substances is lower than the limits prescribed for fuels, and is substantially free of some of the polluting substances, such as polycyclic aromatic compounds, which are present in Diesel oils of a mineral origin (obtained by the processing of crude oil).

The depolymerization process according to the invention can comprise a series of solutions capable of guaranteeing:
- the possibility of feeding the plant with a heterogeneous and "foul" mixture of waste plastic material, whose composition is characterized by a wide variety of polymeric materials and with a significant presence of non-plastic, also rigid elements (sand, stones, metals, glass, wood, etc.);
- the precise control of the significant parameters of the process, despite the presence of potential polluting elements, mechanically difficult to manage (stones and metals inside sensitive areas in the presence of mechanical movements).

The process according to the present invention allows a series of actions to be carried out in sequence, suitable for controlling and maintaining within narrow ranges, the significant parameters that characterize the final product, so as to make said parameters compliant with the provisions of the current regulations on hydrocarbons, such as reference standard EN590.

In the process of the present invention, the depolymerization in liquid phase can take place within one or more similar or identical reactors connected in parallel. These reactors can have a vertical axis, with a cylindrical section, with a rounded bottom at the base, with an upper flat lid having a size equal to the whole horizontal section of the reactor, useful for the maintenance of the reactor itself. A mixer complete with a gearmotor is installed in the axis of the reactor.

The heterogeneous polymeric mixture which constitutes the waste plastic material that feeds the process, after being heated and softened in suitable power extruders in step i. of the process according to the present invention, is fed into these reactors and is heated to a temperature ranging from about 300 to about 400° C. The heating of each reactor takes place by means of the thermal transfer induced by a stream of molten salt heated to a temperature ranging from about 450 to about 550° C. and passed through a jacket that envelops the whole reactor.

The actual depolymerization process takes place along the inner walls of the reactor. When the polymeric molecules, already at the temperature of the liquid bath, approach the wall (at a temperature close to that of the molten salt), they undergo chain breakages due to the temperature. When the single chain has such a length that its boiling point is lower than the temperature of the liquid bath in that point, it changes phase, it becomes gaseous and forms bubbles which become detached from the wall and move towards the surface of the liquid bath of polymeric material. Once they reach the surface, they create a flow of gas essentially consisting of hydrocarbons at a temperature slightly above the temperature of the liquid bath (300° C.-400° C.).

The depolymerization process produces a range of hydrocarbons that are gaseous at operating temperature and pressure. In order to maximize the efficiency of the process, all the hydrocarbons thus produced are used in subsequent applications.

The process according to the present invention produces a heavier fraction of effluents, hereinafter referred to as "paraffins", consisting of hydrocarbons which are gaseous at a temperature of 430° C.-480° C. at ambient pressure, but are solid or highly viscous at room temperature. This fraction can be recirculated in the depolymerization reactor(s) in order to subject it to a new controlled heating cycle and then induce further breakage of the polymer chains suitable for further transforming it.

A fraction of gaseous effluents at atmospheric pressure and a temperature of 20-30° C. is also produced, together with a fraction essentially consisting of hydrocarbons with a composition varying from a minimum number of carbon atoms equal to 5 (C5) up to a maximum number of carbon atoms equal to 16 (C16), which is fractionated into one or more streams, depending on the mixtures of hydrocarbons of interest.

A preferred embodiment of the process according to the invention provides for the fractionation of the effluents from the depolymerization process, which become liquids at room temperature, into two fractions, a fraction (A) comprising hydrocarbons with a number of carbon atoms ranging from 9 to 16, corresponding to Diesel fuel (reference standard EN590) and a fraction (B), corresponding to gasoline. A fraction (C) of hydrocarbons is also produced, which are in the gaseous state if brought to a temperature ranging from 20 to 30° C. and at atmospheric pressure. This fraction, after purification and after being stored in an intermediate gasometer, if not used for other purposes, can be used for the production of thermal and electric energy for the functioning of the plant. Part of the fractions (A) and/or (B) can also be used for the same purpose.

At least one of the gaseous fraction (C) and the fraction (B) of hydrocarbons having a number of carbon atoms ranging from 5 to 8 is preferably used, totally or at least partially, for producing at least part of the electric and/or thermal energy required for the overall process.

The whole process can be carried out in a plant dimensioned so as to be suitable for converting waste plastic material into hydrocarbons, or other raw materials, in a single site. This eliminates the need for transporting the starting material, which often has a very low density and requires numerous journeys for being transferred from the collection site to the processing site, with high transport costs.

The process according to the present invention allows a transformation, also directly at the production site, of a waste plastic material, i.e. a heterogeneous mixture of plastic polymers contaminated by other substances, into one or more hydrocarbons with characteristics compatible with international standards that regulate their entry into the market, without the need for further transformations or adaptations downstream.

The process according to the present invention is sufficiently simple to allow the plant to be managed by personnel having a non-specialized training. The process is managed completely automatically, without the direct intervention of any operator, except for loading operations of the raw materials and maintenance. The process can also be implemented in relatively small plants, which can be situated directly near the site in which the processed waste is produced or accumulated.

As already specified, the process can be completely autonomous from an energy point of view: in this case, the process, both in terms of electric energy and thermal energy, is fed with the hydrocarbon fractions produced by the plant itself.

In addition, the process according to the present invention is extremely efficient in terms of:

mass conversion, defined as the ratio between the weight of the hydrocarbons produced (which can be placed on the market as it complies with international standards) and the weight of the polymeric material charged in the process which, in the case of energy self-consumption, can even be higher than 65% and energy conversion equal to the ratio between the energy contained in the hydrocarbons produced and the potential energy of the material charged in the process, which is close to 90% gross and higher than 75% net (taking into account energy self-consumption).

Energy self-consumption refers to the use of the hydrocarbons produced in the process as fuel for the production of thermal and/or electric energy to be used within the process itself.

A series of solutions ensures that the process according to the present invention can always operate under optimal operating conditions.

In particular, the process according to the present invention is carried out by precisely controlling the following parameters:

temperature values and trend (heating, maintenance and decrement) to which the material is subjected;

values and trend of the pressure to which the material is subjected;

residence time of the material in the various sections of the process; and composition of the internal atmosphere in the various steps of the process and, consequently, in the various points of the plant in which the process is implemented.

In order to control the operating parameters of the process according to the present invention and keep them under optimal conditions, various innovative solutions have been implemented.

The process provides a step for feeding the "hot" section of the process, including the continuous charging of the heterogeneous polymer mixture deriving from waste plastic materials, into the thermal depolymerization reactors. The process according to the invention provides for the material to be heated in the absence of oxygen (pyrolysis) until breakage of the polymer chains.

Said step i. of the process according to the present invention is preferably carried out initially by means of a charging system which allows charging in continuous without introducing the air present in the external storage atmosphere of the waste plastic materials to be fed, into the reactors. The barrier to the potentially oxygen-containing atmosphere can be obtained with a series of expedients that can be implemented in series, so as to obtain a synergistic action.

More specifically, the mixture, optionally after separation of the non-plastic materials and the reduction of the dimensions, is charged into the feeding system (1) of the depolymerization reactor (2) by means of a hopper, or two or more hoppers (4) in sequence, and the oxygen present in the atmosphere of the incoming material is substantially eliminated inside the hopper(s).

The feeding of the waste plastic material to the reactor(s) is carried out by one or more extruders (1) which crush the material, soften it and push it forwards towards the reactor(s), eliminating, in the direction of the loading hopper (4), the gas entrapped in the material.

The heating of the waste plastic material is achieved by means of an adequate heat supply which takes place on the external surface of the extruder (1), preferably by circulating a thermal vector (molten salts) in a suitable jacket (1a).

A valve is mounted in the terminal part of the extruder (1) which, in the event of malfunctioning, closes the extruder and prevents both the internal atmosphere of the reactor from entering the loading hopper and also the atmosphere present in the loading hopper from entering the reactor.

The feeding extruder, having a particular design, as indicated hereunder, carries out a series of functions in succession:

constant charging of the waste plastic materials over time, i.e. the plastic mixtures to be treated;

heating the mixture to the softening point without triggering the "cracking" of non-chlorinated polymers;

compression of the mixture and ejection towards the loading hopper of the air contained therein;

formation of a "plug" of plastic material in motion, which separates the atmosphere of the loading hopper from the atmosphere of the reactor(s);

"cracking" of the possible polymeric fraction containing chlorine at about 150° C. and possible ejection (degassing) of the gas produced potentially containing a significant part of the chlorine possibly present in the plastic mixture being fed;

formation of a moving plastic plug, which separates the degassing area from the atmosphere of the reactor with a slight overpressure (20-100 mBar).

The incoming plastic material can have very different apparent densities: ranging from a very low density (less than 50 kg/m$^3$) up to 900 kg/m$^3$.

The particular design of the dosing and feeding screw (11) to the extruder and the design of the first part of the extruder screw guarantee a constant feeding of material.

Figure 3:
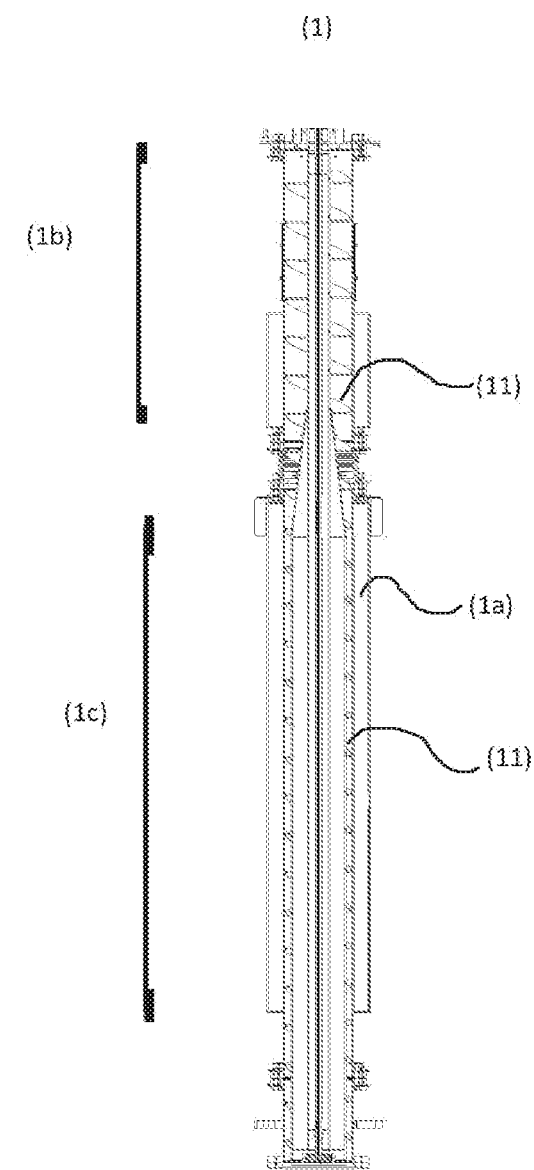
FIG. 3 shows a scheme of an extruder (1) with a screw (11) that can be used in the process according to the present invention.
Figure 4:
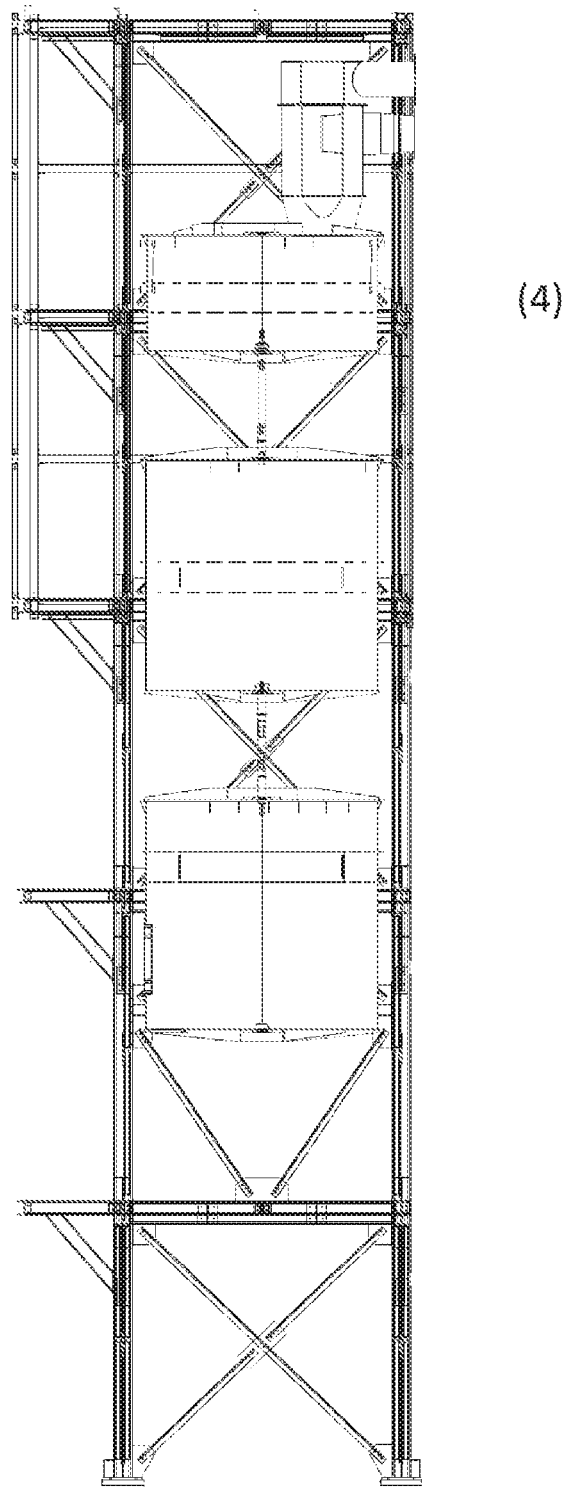
FIG. 4 shows a scheme of the hopper system (4) that can be used in the process according to the present invention.
Figure 5:
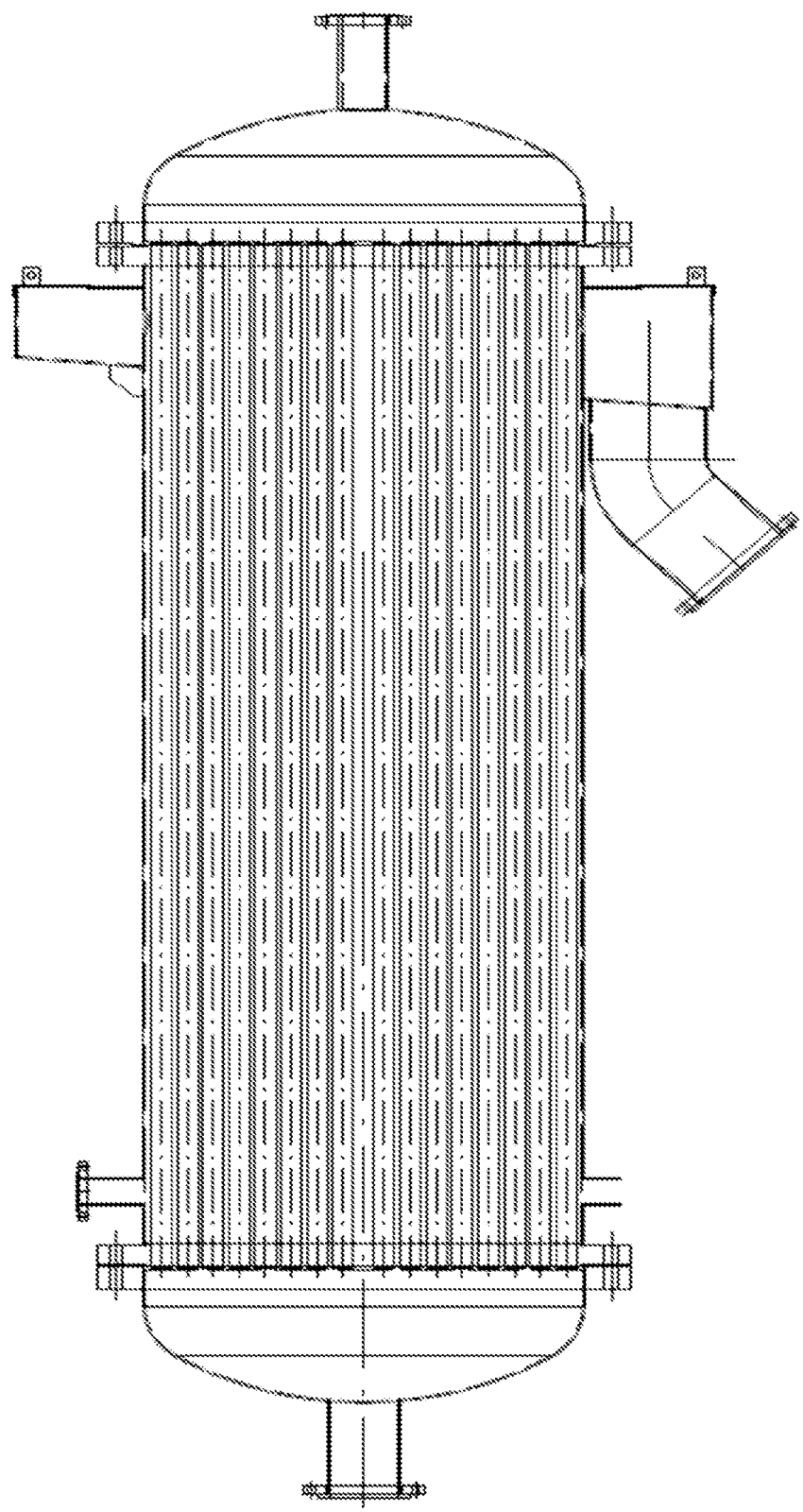
FIG. 5 shows a scheme of the condensers (12) that can be used in the process according to the present invention.
Figure 6:
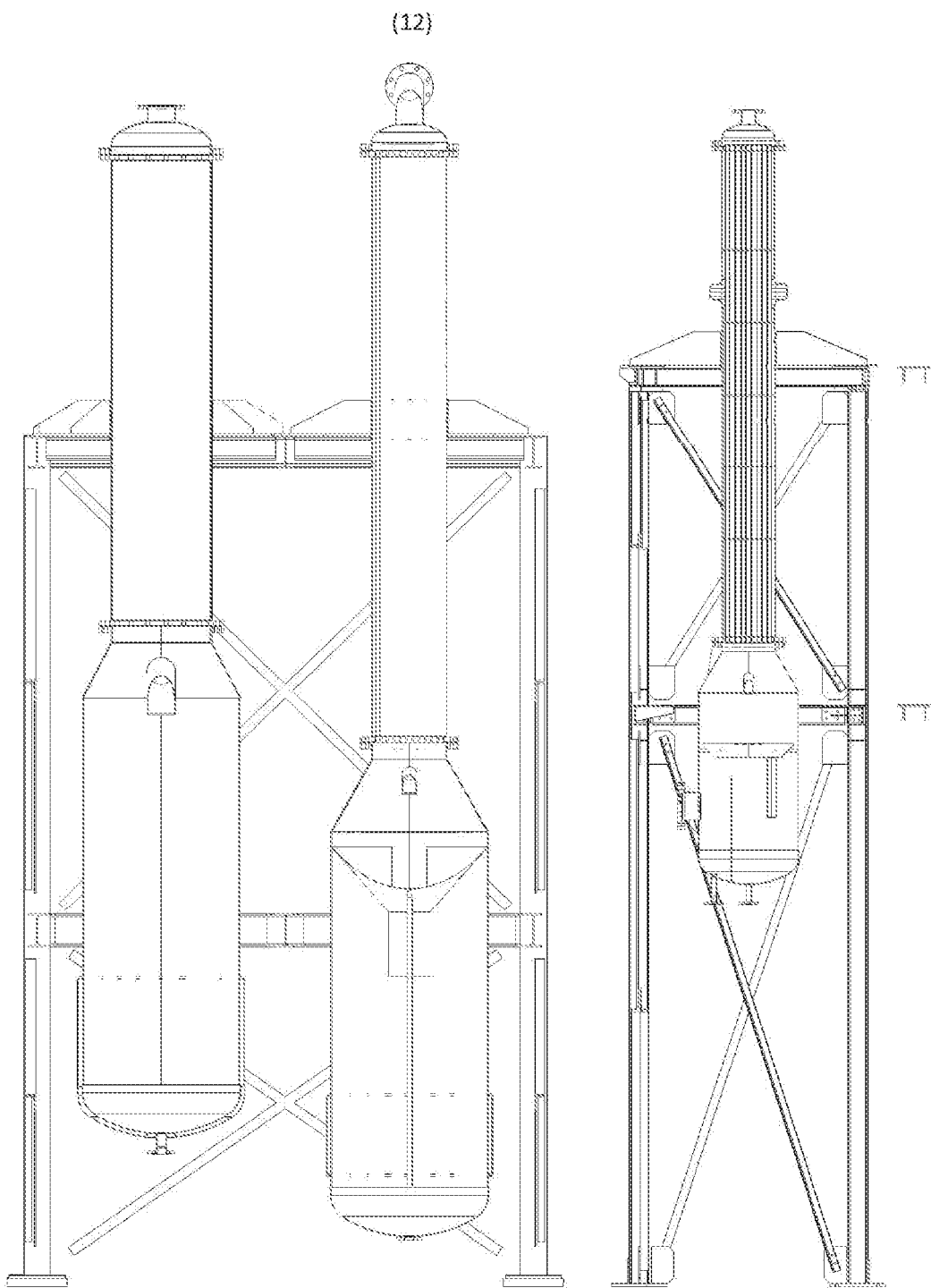
FIG. 6 shows a scheme of a reactor (10) in gaseous phase (secondary) that can be used in the process according to the present invention.
Figure 7:
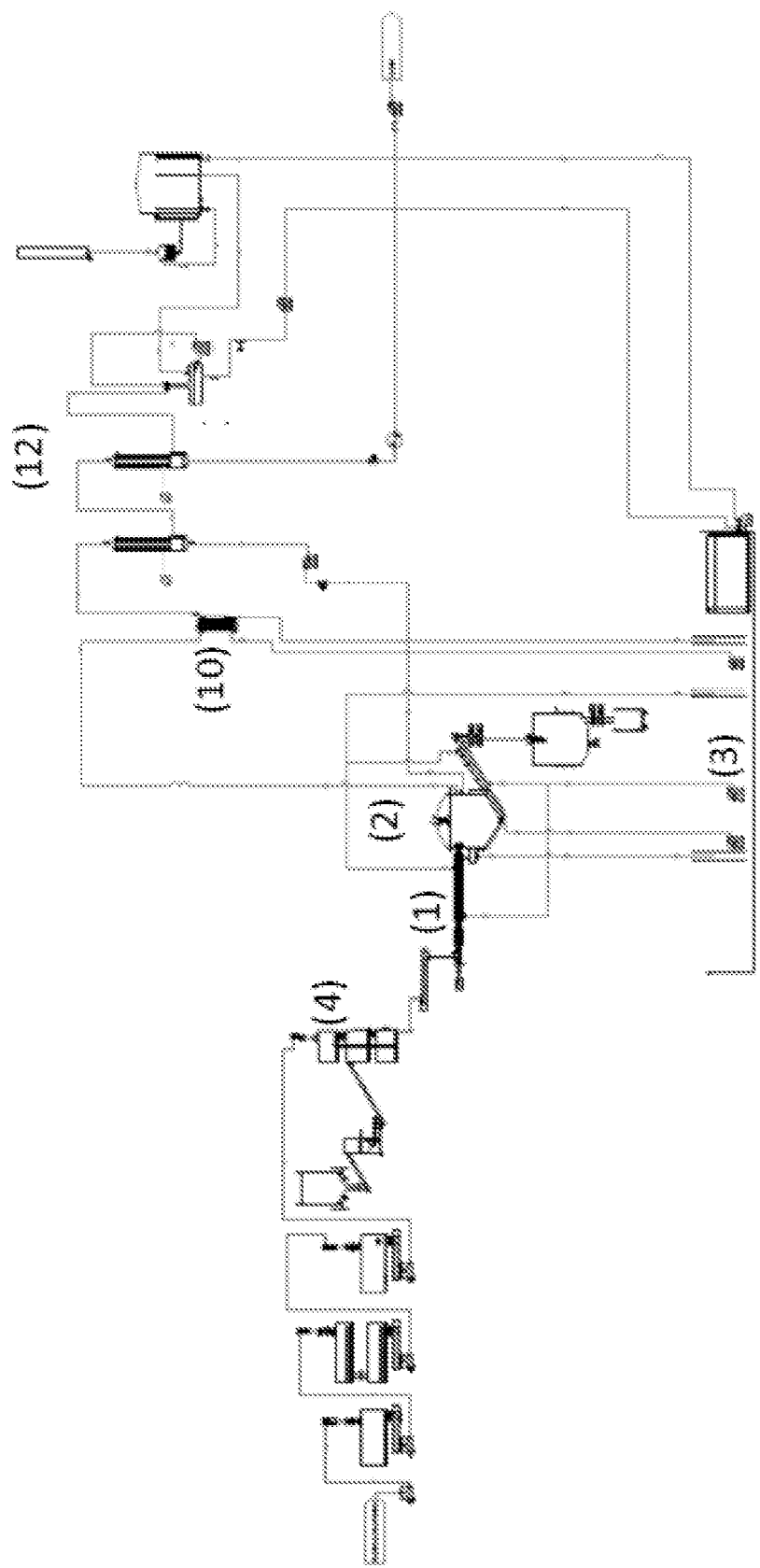
FIG. 7 shows a schematic example of a portion of a plant for the process according to the invention, comprising the parts indicated in the previous figures.

As shown in FIG. 3, the screw (11) in the initial area (1b), i.e. the charging area, preferably has a configuration which allows it to move a much larger volume with respect to the main section equipped with a heating jacket. This capacity is preferably achieved by using a screw shaft (11) with reduced dimensions with respect to the diameter of the extruder and/or by lengthening the screw pitch in the first part, i.e. the loading step of the extruder.

After the first feeding part (1b), in the subsequent part (1c) of the extruder, which conveys the extruded plastic materials directly towards the reactor (2), the shaft of the screw (11) preferably has a wider diameter than the previous section and/or the extruder screw has a reduced pitch, so as to crush the plastic materials and push them forwards, eliminating all the gas trapped in the plastic materials, backwards, in the direction of the material being fed.

This gas, coming from the loading hopper of the extruder, must be eliminated as it could contain a quantity of atmospheric oxygen not compatible with the process according to the present invention. In the final section of the extruder, the plastic material is heated to the softening temperature and is kneaded to create a homogeneous and dense mixture.

The thermal energy necessary for heating the polymeric mixture during feeding and its softening is partly supplied by the friction generated by the extruder (1) between the mixture itself and the mechanical components of the extruder, and partly through the heating of the extruder, preferably by means of a jacket (1*a*) in which molten salts are circulated. This heating solution makes the extruder particularly resistant to the presence of materials such as debris, stones, metals, etc., possibly present inside the material charged as the distance between the screw and the wall of the screw is greater than 5 mm.

The purpose of heating the extruder (1) from the outside is also to obtain the formation of a thickened and compact waste plastic material which, once inside the main reactor, does not float, but sinks immediately into the liquid bath. Plastic materials, by nature, have a very low heat transfer coefficient and typically appear in the form of a crumpled film. The plastic materials being fed, if not properly treated in step i. of the process according to the present invention, would tend to float over the liquid bath present inside the reactors and would heat up very slowly.

In a section of the extruder closest to the reactor to be fed, the screw (11) is designed so as to further heat the plastic material up to a temperature of at least about 150° C. The minimum temperature is determined by the softening temperature of the plastic materials. In the extruder used in the process according to the invention, the material is heated to about 180° C., i.e. to a temperature lower than the cracking temperature of most of the plastic polymers which, however, must, take place inside the main reactors.

The cracking must take place as much as possible under the wall conditions of the main reactor in order to obtain a product with marked characteristics around the desired values; the process is therefore carried out so as to obtain the least possible cracking in the feeding extruder. It is believed that at 150° C., the plastic fraction containing chlorine at least partly gasifies, releasing a significant part of the chlorine present in the composition of the PVC (polyvinyl chloride) possibly present in the waste plastic material which is fed. The extruder (1), in a preferred embodiment, is capable of expelling, through a specific degassing duct (not shown in FIG. 3), the gas possibly thus produced.

In a last section of the extruder (1), the dense, gas-free plastic material also acts as a sealant for separating the degassing area from the internal atmosphere of the reactor.

The depolymerization reactor of the waste plastic material supplied by the extruder is a reactor (2) with a vertical axis having a cylindrical section, preferably with a rounded bottom and/or preferably with an upper flat lid having the same horizontal section as the reactor, useful for the maintenance of the reactor itself. A mixer (7) is installed in the axis of the reactor, complete with a gearmotor which can operate, as a non-limiting example, at a speed of 30-40 rpm.

The heterogeneous mixture of plastic material is in liquid form inside the reactor (2), and is kept at a temperature ranging from about 300° C. to 400° C. The heating of the single reactor takes place by means of the thermal transfer induced by a flow of molten salt, heated to a temperature ranging from 450° C. to 550° C. and circulated through a jacket having particular design, which envelops the whole reactor.

The depolymerization process takes place mainly along the internal walls of the reactor. The polymeric molecules in the liquid bath when approaching the wall (at a temperature close to the temperature of the molten salt) undergo chain breakage due to the action of the temperature (pyrolysis). When the single chain has a length which is such that the substance corresponding to it has a boiling point lower than the temperature of the liquid bath in that point, at the operating pressure, it changes phase, becomes gaseous and forms bubbles which detach from the wall and move towards the surface of the liquid bath of polymeric material.

This gaseous phase which is formed inside the reactor(s) consists of molecules that react with each other (recomposition or re-forming), undergo further breakages or also react with the liquid phase. Once they have reached the surface, the substances thus formed create a flow of gas essentially consisting of hydrocarbons at a temperature slightly higher than the temperature of the liquid bath (300° C.-400° C.).

The heat flow present on the wall is influenced by:
the heat exchange coefficient of the plastic mixture present inside the reactor in liquid form at 300-400° C.;
the average thickness of the layer of bubbles generated on the wall and moving towards the surface of the bath;
the thickness of the carbon layer formed on the wall as a result of the depolymerization process that takes place on the wall itself;
the characteristics of the metal of the reactor wall, which are suitable for ensuring maintenance of the mechanical characteristics provided also in the presence of chemically aggressive substances;
the temperature and flow-rate of liquid salt circulating in the reactor jacket;
the flow-rate of plastic materials, induced by the mixer, which comes into contact with the inner part of the reactor.

Each reactor (2) is characterized by:
a height of the liquid bath which is preferably at least 500 mm and which ensures control of the passage time of the bubbles through the liquid bath;
an area above the liquid bath having a minimum volume, in order to reduce the residence time of the gas produced inside the reactor as much as possible, as a small chamber available for the gaseous phase above the bath minimizes the variation of the gas residence time inside the reactor as the process parameters change;
a feed extruder (1) which guarantees charging in continuous, positioned immediately above the free surface of the liquid bath;
a mixer (7), which ensures a controlled movement of the liquid bath contained in the reactor in order to:
keep the liquid bath homogeneous;
favour the dissolution of the plastic materials charged by the feed extruder;
maintain a temperature variation inside the reactor within a maximum of 3° C. of difference between one point and another;
guarantee a constant flow of polymeric liquid that touches the inner wall of the reactor; and
maintain a layer having a controlled thickness of carbon on the inner wall of the reactor.

The depolymerization process, in fact, provides for the release of one carbon atom for each pair of breakages of the polymer chain. These carbon atoms are fixed in the point where the breakage occurs and form a layer of carbon along the wall. The mixer (7) is preferably provided with suitable scrapers (8), with a spring movement system, which guarantee the scraping of the carbon layer formed continuously on the reactor wall, maintaining a fixed, controlled thickness.

The spring movement system ensures that the scrapers are sufficiently rigid as to keep, by scraping it, a layer of carbon having a constant thickness, but they give way when rigid bodies slip between the scraper and the wall. For this purpose, scrapers (8) conformed to the shape of the wall are mounted on supports rotating around an axis positioned at a distance of 10-30 cm from the wall of the reactor. The scrapers are maintained by springs (10) in abutment with respect to stops which can be adjusted so as to guarantee a desired distance from the wall.

In the presence of rigid foreign bodies, the scraper group has the possibility of moving away from the wall, overcoming the force of the springs. In the case of the formation of an excessive layer of carbon, the scraper mounted on the rotor scrapes the coal that has possibly been formed in a series of successive passages until it reaches the adjustment stop at the desired distance from the wall. The presence of rigid bodies may depend on the fact that the plastic materials charged into the reactor(s) are potentially polluted by foreign elements that do not undergo the depolymerization process (sand, stones, metals, glass and the like).

A possible loss of integrity of the carbon layer formed on the inner surface of the reactor is subsequently restored following the continuation of the depolymerization process. This carbon layer can have a thickness of 0.5 to 20 mm. A thickness of the carbon layer equal to 5-6 mm represents a preferable value for obtaining a good protection for the inner wall of the reactor.

The reactor (2) according to the present invention comprises an external jacket (5) through which a flow of liquid salts passes, i.e. molten salts, useful for ensuring the necessary supply of heat to the reactor. The feeding circuit (3) of the molten salt to the reactor jacket is constructed in such a way that, in the event of an anomaly, all of the salt falls, by gravity, into the containment tank of the molten salts, positioned below the same reactor. In particular, during functioning, the salt is pushed into the jacket from below. A series of fins guarantees a homogeneous distribution of the flow of molten salts in the jacket and a velocity suitable for maximizing the thermal exchange coefficient. Once the salt has reached a level slightly above the liquid surface of the bath inside the reactor, it collapses into an external chamber and from there, by gravity, it is conveyed back into the salt tank.

In a preferred embodiment, in the process according to the invention, the molten salts with which the reactor (2) and the feeding system (1) are heated comprise, or consist of, binary, ternary, quaternary salts or mixtures thereof, with a melting temperature ranging from about 100° C. to about 250° C., preferably molten salts which comprise, or consist of, a mixture of sodium nitrate and potassium nitrate, even more preferably in a weight ratio ranging from 2:3 to 3:2.

In a preferred embodiment, in the process according to the invention, the solid residues that accumulate in the depolymerization reactor (2) are conveyed towards the outside of the reactor (2) through a discharge system which comprises a screw conveyor (6).

The reactor is equipped with a screw conveyor (6) connected to the base of the reactor (2) and with the discharge head positioned above the level of the liquid bath present inside the reactor. The screw (6) is used for discharging the solid fraction that accumulates during the process inside the reactor. The screw, like the reactor, is heated by a jacket with a flow of molten salts at a temperature of 450-550° C. The discharge screw advantageously allows the extraction of the solid residue of the reactor to which it is connected without the need for isolating the reactor from the other reactors operating in parallel. The possible need to insert shut-off valves between the reactors would cause safety problems for the plant (an anomalous closure could lead to closed chambers, overpressures and the risk of explosion). The configuration of the screw is such that the valves that allow the discharge of the solid residue (at the same time guaranteeing the separation between the internal atmosphere of the reactor and the inert atmosphere of the management system of the solid residue) are positioned in an area above the level of the liquid plastic mixture present inside the reactor, so as to guarantee its operation under more favourable conditions and easier maintenance as the valves are not fouled by the plastic liquid. The same screw is heated by means of a system that uses molten salts as thermal vector.

The depolymerization process requires that most of the polymeric fraction of the waste plastic materials, i.e. the matrix charged into the reactors, be transformed with great efficiency into gas. The non-polymeric fraction and the carbon released by the cleavage of the polymer molecules accumulate in the bottom of the reactors. The reactors are sized so that, with a typical starting matrix composition of PLASMIX, the accumulation of the solid residue inside the single reactor occupies one third of the volume of the liquid bath after a period of 4-6 days.

In order to keep the process according to the present invention, continuously active (in the case of more than one thermal depolymerization reactors), under controlled conditions and to obtain a solid residue which, once discharged, complies with the specifications of a special non-hazardous waste, a method for managing the various reactors in parallel was identified, which, in turn, allows the emptying of the solid residue, after having made it completely free of hydrocarbons.

When one of the reactors has a solid content equal to the limit quantity, the charging of the plastic material is interrupted by (1) and the depolymerization step ii. continues until the polymer fraction is completely transformed into gas.

In a preferred embodiment, the molten salt heating system (3) is kept continuously on, as the reactor is connected to all the other active reactors and the gas coming from the other active reactors is thus prevented from condensing possibly in the cooler reactor. Once the gasification process of the polymeric fraction has been completed in the reactor being emptied, the reactor (2) is emptied by means of the discharge screw (6), complete with two valves at the discharge end. The valves are opened alternately to allow the passage of the solid material without putting the atmosphere of the system receiving the solid material in contact with the atmosphere of the reactor. Once the desired quantity of solid material has been discharged, the exhaust system (6) is blocked and the loading system (1) is reactivated by means of an extruder. The feeding rates of the active reactors are managed so as to obtain an adequate overall gas flow during the discharge cycle of a single reactor.

The discharge screws (6) of the various reactors are, in turn, connected to each other by screw conveyors. These conveyors move the solid material discharged still hot (450° C.-550° C.) and strongly reactive in air (the carbon released by the depolymerization reactions is absolutely anhydrous and reacts instantly without the presence of flame with the oxygen present in the air) in a cooling tank.

From here, the solid is discharged into a second tank suitable for transporting the solid residue classified as special non-hazardous waste, for its disposal according to the indications provided by law. The whole transportation and storage system, as also the loading system into the transportation tanks for disposal, are maintained in an inert atmosphere by the continuous injection of a nitrogen flow.

As described above, in a preferred embodiment of the present invention, the process according to the invention comprises a step for preparing the mixture used in step i. starting from waste plastic materials through a pre-treatment step which includes the separation of elements comprising non-plastic materials and, if necessary, a reduction of plastic materials to dimensions not exceeding 50 mm×50 mm×4 mm.

In this embodiment, prior to their use in step i. of the process according to the invention, the waste plastic materials being fed are preferably mechanically processed in order to make them suitable for loading in the depolymerization step (and line), by means of one or more of the following processes:

- separation of the single plastic components that constitute the incoming mixture (the material is often in the form of pressed bales);
- reduction of the size of the plastic material to a size of less than 100 mm×100 mm×4 mm and separation of the fraction with a size less than 10 mm×10 mm×10 mm as it essentially consists of sand, earth and glass, i.e. inert fractions and not useful for the depolymerization process;
- separation of the polymer fractions not compatible with the process (PET, PVC above all), which can be effected by flotation in water, by means of manual selection lines or by automatic separation optical systems. In the case of the use of flotation in water, the outgoing material can undergo a further washing to remove the paper and a centrifugation to eliminate most of the water used for the flotation and washing;
- separation of the magnetic and non-magnetic metal fractions;
- further reduction in size to less than 50 mm×50 mm×4 mm; and
- drying, in which, in order to optimize the use of the thermal energy necessary for running the plant and to avoid the formation of oxygen inside the depolymerization reactors, the fumes leaving the heating boiler of the molten salts can be used with a suitable fumes/air exchanger to produce the flow of hot air necessary for drying the material.

By way of non-limiting example, the material to be depolymerized is sent to the depolymerization reactor(s) (2) by means of three feed hoppers (4) in sequence, which are separated, respectively, by two valves which are alternately opened. When the valve between the first tank and the second tank is open and the valve between the second and the third tank is closed, the material is loaded from the first tank into the second tank. Once the valve between the first tank and the second is closed, the atmosphere in the second tank is replaced by 99.9% pure nitrogen to eliminate any trace of oxygen. Once the process has been completed, the valve between the second tank and the third tank is opened and the material is transferred to the third tank, used for the continuous feeding of the reactors.

At the end of the transfer operation of the material from the second to the third tank, the valve between the second tank and the third tank is closed and a flow of nitrogen is introduced again into the second tank to eliminate any trace of gas potentially polluted by the internal atmosphere of the reactors (mixture of hydrocarbons) before opening the valve between the first and the second tank. The gas leaving the second tank pushed by the nitrogen is sent to the flare stack and treated according to the indications provided by law.

In a preferred embodiment, the process according to the present invention, further comprises:

iii. a depolymerization step in gaseous phase, in which the gaseous effluent leaving the reactor (2) after step ii., is sent into at least one secondary reactor (10), where it undergoes a heating cycle at a temperature ranging from 450 to 500° C. with a duration of less than 1 second and is subsequently maintained at a temperature ranging from 400° C. to 480° C. for a time ranging from about 15 to about 30 seconds.

In the depolymerization step in gas phase, the gas leaving the depolymerization reactor (2) of step ii., described above, undergoes a second transformation process inside the secondary reactor (10). The secondary reactor (10) consists of a tube bundle through which a controlled flow of molten salt passes, in the mantle side, at a temperature of 450-550° C. Said tube bundle imposes a very rapid heating cycle (in a time of less than one second) on the gas produced by the main reactors and maintenance at a set point temperature from 400° C. to 480° C. in a predetermined time, typically ranging from 15 sec. to 30 sec. This transformation, by means of reactions of further breakage and recombination of the polymer chains, modifies the distribution of the lengths of the hydrocarbons present in the gas, influencing their average value (for example, to produce, on the basis of specific requirements, a lighter mixture centered around the composition of a specific main product) and variance (to maximize the production of the desired product). In this way the process can be adapted in such a way as to maximize the production of hydrocarbons with a distribution compliant with hydrocarbons whose specification is defined (for example, in the field of automotive gasoline, automotive Diesel, kerosene, naphtha, Diesel fuel for heating, fuel oils) or reproduce specific mixtures of liquid and gaseous hydrocarbons on definite specifications.

The subsequent condensation step preferably takes place in at least two condensers (12) immediately downstream of the secondary reactor (10), to impose a sudden cooling (in a time of less than one second) on the gas mixture, in order to block the depolymerization process. By way of non-limiting example, in the specific case of the production of a liquid fuel mixture compliant with the standard EN 590: 2013,

- the first condenser consists of a tube bundle cooled with forced air; the outlet temperature of the gaseous mixture is about 285° C. The condensed liquid consisting mainly of long-chain hydrocarbons greater than C16 is sent to the primary reactor(s) to undergo a further depolymerization process;
- the second condenser consists of a tube bundle cooled with forced air; the outlet temperature of the gaseous mixture is about 152° C. The condensed liquid, consisting mainly of hydrocarbons ranging from C9 to C16, constitutes the main product of the process and has a composition compatible with the standard EN 590:2013;
- the third condenser consists of a liquid scrubber. The condensed and cooled liquid is used for washing and cooling the incoming gas flow. The outlet temperature of the gaseous mixture is about 30° C. The condensed liquid mainly consists of hydrocarbons ranging from C5 to C8 and is used for the production of electric and thermal energy necessary for the functioning of the plant.

The process according to the present invention comprises a thermal cycle which provides an outgoing mixture of hydrocarbons that is very stable over time, with considerable advantages with respect to the mixtures obtained by the known techniques, which must be further stabilized to avoid the conversion of some of the components.

In one embodiment, the present invention relates to a mixture of hydrocarbons, which can be used as fuel, that can be obtained by the process described above, which is practically free of polycyclic aromatic hydrocarbons (content lower than 2% by weight/total weight of the mixture) and containing an extremely low quantity of sulfur (at least 1-2 orders of magnitude compared to the more restrictive limits intended for fuels for marine use by international standards as of 1/1/2020 (e.g. European directive 2016/802), therefore compatible with its use as a "sulfur-free fuel". By way of non-limiting example, in the hydrocarbon mixture that can be obtained according to the present invention, the sulfur content can be compatible with the reference standard EN590 (not greater than 10 mg/kg).

It has also been found that the fuel of the present invention, that can be obtained by the process described above, contains a high percentage of olefin compounds with a double vinyl-type bond (preferably from 35 to 45% or from 38 to 40% by weight/total weight of the mixture).

In one embodiment, the present invention relates to a reactor (2) having a cylindrical section with a vertical axis, having a mixer (7) complete with a gearmotor installed in the axis of the reactor, wherein the interior of said reactor (2) comprises a lower area that can be used for the formation of a polymeric liquid bath and an upper area which can receive a gaseous effluent deriving from the depolymerization of said polymeric liquid bath and having a volume which is less than 20% of the total volume of the interior of the reactor (2), preferably less than 15% of the total volume of the reactor, in order to reduce the residence time of the gaseous effluent produced inside the reactor as much as possible, a screw conveyor (6) connected to the base of the reactor (2) and having the discharge head positioned above the level of the polymeric liquid bath present inside the reactor, and a jacket (5) for heating by means of molten salts and external to the reactor body, connected to a system for transporting, heating and storing the molten salts (3).

The bottom and the walls consist of a double wall. The molten salts used as thermal vector pass through the chamber between the two walls that make up the side walls and the bottom of the reactor. The salts enter the centre of the bottom and rise along the jacket guided by a series of septa that impose a helical path such as to guarantee a uniform distribution of the velocities, thus minimizing the temperature differences between the various points of the jacket and guaranteeing an adequate velocity for ensuring high heat exchange coefficients. Once it has reached the top of the side wall at the maximum level of the liquid inside the reactor, the salt exits from the jacket and falls into an external collector that brings the salt back into the molten salt tank. The feed extruder feeds the material into the reactor immediately above the free surface of the plastic bath inside the reactor. The reactor is designed for minimizing the free volume above the free surface of the molten plastic material in order to minimize the residence time in the reactor of the gas produced by depolymerization of the plastic mixture introduced. The height of this free area is determined by the height of the feed extruder.

The following examples are provided for illustrating some embodiments of the invention, without limiting its scope.

The mass balance is indicated in Table 3, where the data are reported with reference to a "standard" plant with a PLASMIX treatment capacity of 9,000 tons/year (different production capacities are, of course, possible).

TABLE 3

| INPUT | | | |
|---|---|---|---|
| PLASMIX1240 plastic waste in input | | 1,240 kg/hr | 9,000 t/year |
| OUTPUT | | | |
| Discarded fraction in pre-treatment | | 248 kg/hr | 1800 t/year |
| Humidity (before the dryer) | 15% w/w | 149 kg/hr | |
| Ash (non-hazardous solid waste) | | 97 kg/hr | 702 t/year |
| Liquid light fraction produced | 17% w/w | 139 kg/hr | |
| Gaseous fraction produced | 8.2% w/w | 67 kg/hr | |
| Diesel type oil produced | 66% w/w | 542 kg/hr | 3928 t/year |
| Electricity for sale (based on extra gasoline production) | | | 2783 MW hr/year |
| Conversion efficiency of the polymeric fraction [Hydrocarbons for sale (t)/pure polymeric fraction (t)] | | | 66.2% |
| Conversion efficiency of plastic waste [Fuel sold (t)/plastic waste (PLASMIX) in input (t)] | | | 43.6% |

Table 3 - Mass balance - Data referring to a PLASMIX treatment plant of 9,000 tons/year (the data are indicative, also taking into account the dependence on the specific composition of the raw materials).

Table 4 shows, again for indicative purposes, the thermal and electric requirements for a 9,000 ton/year PLASMIX treatment plant.

| THERMAL CONSUMPTION OF THE WHOLE PLANT (POWER) | | | |
|---|---|---|---|
| Dryer | Recovery | 150 kWh/h | 100° C. |
| Process | | 751 kWh/h | 450-550° C. |
| ELECTRICAL CONSUMPTION OF THE WHOLE PLANT (POWER) | | | |
| Pre-treatment | | 247 | kWe |
| Process | | 197 | kWe |
| Overall electrical efficiency, excluding self-consumption [(kWh associated with the fuel produced + electric kWh for external uses/kWh plastic residue] | | | 76% |

Different mixtures of waste plastic materials were tested in a plant that implements the process according to the present invention. In particular, numerous "lots" of the above-mentioned waste materials generally referred to as "PLASMIX" were used.

In any case, the process according to the present invention carried out in this plant guarantees the best use of the energy content of all the types of waste tested.

The environmental impact of the plant according to the present invention for carrying out the process according to the present invention was not significant. The liquid effluents of the pre-treatment were in fact released into the environment, with a very limited flow-rate and with "polluting" characteristics well below the limits of law, together with the gaseous discharges of the burner that supplies the heat to the process and those of the motor generator that generates the electricity necessary for the process, and also, if applicable, for sale, with an impact well below the law limits, and finally solid discharges (essentially, coal dust and possible mineral charges present in the plastic waste or salts generated in the neutralization of possible acids produced by non-eliminated plastic fractions), which are special non-hazardous waste.

Some data are provided hereunder relating to the economic advantages associated with the depolymerization process of waste plastic materials according to the present invention.

For the sake of simplicity, reference is made to a complete pre-treatment plant (more conservative hypothesis) having a capacity of 9,000 tons/year; in the case of different capacities, especially in the case of larger capacities, scale factors are possible.

The economic advantages evidently vary depending on different parameters which, in turn, depend on the specific location of the plant and the characteristics of the waste to be treated. The main hypotheses adopted in the analysis reported herein are summarized hereunder.

Use tests were carried out with an experimental apparatus comprising a three-cylinder aspirated Diesel engine in line with a 1,028 $cm^3$ displacement, 77.6 mm stroke, 5.0 mm bore, a compression volumetric ratio of 17.5:1, common rail injection system, maximum intake pressure 1,400 bar.

The tests were carried out by feeding the experimental apparatus described above with the fuel "A" (Diesel fraction) according to the present invention or with a standard Diesel fuel (IES 590 (standard Diesel fuel for motor vehicles)), obtaining similar results with respect to both engine performance and NOx, PM, CO and HC emissions).

The results obtained are summarized in the following table:

| Load | Comb. | Torque [Nm] | Power [kW] | $\dot{m}_a$ [kg/h] | $\dot{m}_f$ [kg/h] | CO Average [g/kWh] | CO Dev. st | HC Average [g/kWh] | HC Dev. st |
|---|---|---|---|---|---|---|---|---|---|
| Full load (100%) | C | 45 | 16.4 | 106 | 4.26 | 10.96 | 0.26 | 2.31 | 0.07 |
|  | A | 44 | 16 | 110 | 4.08 | 8.12 | 0.03 | 2.06 | 0.01 |
| 75% load | C | 33 | 12 | 108 | 3.22 | 8.37 | 0.05 | 1.57 | 0.01 |
|  | A | 33 | 11.9 | 109 | 3.08 | 6.87 | 0.14 | 1.43 | 0.02 |
| 68% load | C | 28 | 10.9 | 108 | 3.02 | 10.96 | 0.26 | 2.31 | 0.07 |
|  | A | 30 | 10.9 | 110 | 2.91 | 8.12 | 0.03 | 2.06 | 0.01 |
| Medium load (50%) | C | 23 | 8.5 | 108 | 2.63 | 16.41 | 0.35 | 3.84 | 0.07 |
|  | A | 23 | 8.4 | 110 | 2.52 | 12.71 | 0.15 | 2.95 | 0.01 |
| Low load (30%) | C | 14 | 4.8 | 110 | 1.99 | 31.24 | 0.01 | 11.43 | 0.1 |
|  | A | 14 | 5 | 111 | 1.88 | 19.77 | 0.01 | 6.23 | 0.06 |

Fuel: A = fuel according to the invention; C = Diesel IES 590 (comparative)
Load = position of the accelerator pedal
$\dot{m}_a$ = mass flow-rate of air entering the engine
$\dot{m}_f$ = mass flow-rate of fuel entering the engine The following main data were used:
Input of raw materials (referring to the worst plastic waste material, PLASMIX): 9,000 tons/year (a higher capacity is easily achievable through several units that operate in parallel, whereas a lower capacity can lead to reduced economic profitability of the investment)
Diesel production: 3,928 tons/year.

Considering factors including the costs of the various parts of the plant, civil works and personnel and the estimated annual average revenues, the process according to the present invention is economically convenient and ensures an excellent economic return in the short term, in addition to enormous advantages from an ecological point of view and upgrading of waste.

The process according to the present invention allows waste plastic materials, even of poor quality, to be transformed into an excellent mixture of hydrocarbons, with very high yields.

The process according to the present invention is particularly advantageous in terms of environmental protection (it avoids the release of plastic waste into sea or on land, even in landfills) and as it allows the production of goods (by way of non-limiting example: Diesel oil, electricity), thus upgrading waste plastic materials and avoiding the use of petroleum derivatives.

The efficiency of use of waste suitable for depolymerization is extremely high and is close to 90% before self-consumption and higher than 75% net. The efficiency of competing techniques, on the other hand, such as use in incinerators or cement plants, is enormously lower (overall efficiency in incinerators is generally much lower than 10%).

It was found that, in certain test regimes, with the fuel according to the invention, smoke levels were generated which were lower than those generated with the control fuel.

The invention claimed is:
1. A process for depolymerizing waste plastic material, wherein said process comprises the following steps:
   i. charging a mixture comprising waste plastic materials in an oxygen-free atmosphere into a feeding system comprising at least one screw extruder, which is heated at such a temperature that the material exiting from the extruder is at a temperature ranging from 150 to 180° C.;
   ii. charging the plastic material coming from the extruder in the previous step directly into a reactor having a body and a base, in which a liquid bath of polymeric material is formed and the thermal depolymerization takes place, forming a gaseous effluent, wherein, in the reactor, the area available for said gaseous effluent above the liquid bath has a volume which is less than 20% of the total volume, in order to reduce the residence time of the gas produced inside the reactor, and said reactor is heated to 300-450° C. by means of a stream of molten salts in a jacket outside the body of the reactor and connected to a system for transporting, heating and storing the molten salts and is provided with a screw conveyor connected to the base of the reactor and having a discharge head positioned higher than the level of the liquid bath present inside the reactor.

2. The process according to claim 1, wherein the waste plastic material fed in step i. is prepared starting from waste plastic materials by means of a pre-treatment step, which comprises separating from the polymers suitable for depolymerization, elements composed of non-plastic materials and, plastic materials not compatible with the subsequent process and reducing plastic materials with dimensions not exceeding 50 mm×50 mm×4 mm.

3. The process according to claim 1, wherein the mixture is fed into the feeding system of the thermal depolymerization reactor through a hopper in which the oxygen present in the atmosphere of the incoming material is substantially eliminated.

4. The process according to claim 3, wherein the mixture, optionally after separating the non-plastic materials and/or incompatible materials and reducing the dimensions, is fed into the feeding system (1) of the thermal depolymerization reactor (2) through two or more hoppers in sequence.

5. The process according to claim 3, wherein the mixture is fed into the feeding system of the thermal depolymerization reactor after separating the non-plastic materials and/or incompatible materials and reducing the dimensions.

6. The process according to claim 1, further comprising:
   iii. a depolymerization step in gas phase, wherein the gaseous effluent exiting from the reactor step ii. is conveyed into at least one secondary reactor, where it undergoes a heating cycle at a temperature ranging from 450 to 500° C. with a duration of less than 1 second and, subsequently, is kept at a temperature ranging from about 400 to about 480° C. for a time ranging from about 15 to about 30 seconds.

7. The process according to claim 1, wherein the solid residues which accumulate in the depolymerization reactor are conveyed towards the outside of the reactor through a discharge system comprising an externally heated screw conveyor.

8. The process according to claim 1, wherein the molten salts are taken from the group consisting of binary, ternary, quaternary salts and mixtures thereof, with a melting temperature ranging from about 100 to about 250° C.

9. The process according to claim 8, wherein the molten salts comprise a binary salt taken from the group consisting of sodium nitrate, potassium nitrate and mixtures thereof.

10. The process according to claim 9, wherein the mixture of sodium nitrate and potassium nitrate are in a weight/weight ratio ranging from 2:3 to 3:2.

11. The process according to claim 1, wherein, at the end of the depolymerization step, a fraction (A) is obtained, which comprises hydrocarbons having from 9 to 16 carbon atoms compliant with a Diesel fuel pursuant to the standard EN 590:2013, a fraction (B) of hydrocarbons having from 5 to 8 carbon atoms or a fraction (C) comprising hydrocarbons in the gaseous state at atmospheric pressure and at a temperature ranging from 20 to 30° C.

12. The process according to claim 11, wherein at least one of the gas fraction (C) and the fraction (B) of hydrocarbons having from 5 to 8 carbon atoms is used for producing at least part of the electric or thermal energy required for the overall process.

13. The process according to claim 11, wherein at least one of the gas fraction (C) and the fraction (B) of hydrocarbons having from 5 to 8 carbon atoms is used for producing at least part of the electric and thermal energy required for the overall process.

14. A mixture of hydrocarbons obtained by the process according to claim 1, essentially free of polycyclic aromatic hydrocarbons and comprising a quantity of sulfur lower than 50 mg/kg.

15. The process according to claim 1, wherein the area available for said gaseous effluent above the liquid bath has a volume which is less than 15% of the total volume of the reactor.

16. The process for depolymerizing waste plastic material of claim 1, wherein in step (i) said feeding system is heated by circulating molten salts in a suitable jacket positioned on the outside of the extrusion chamber.

17. The process according to claim 1, wherein, at the end of the depolymerization step, a fraction (A) is obtained, which comprises hydrocarbons having from 9 to 16 carbon atoms compliant with a Diesel fuel pursuant to the standard EN 590:2013, a fraction (B) of hydrocarbons having from 5 to 8 carbon atoms and a fraction (C) comprising hydrocarbons in the gaseous state at atmospheric pressure and at a temperature ranging from 20 to 30° C.

18. A reactor with a cylindrical section and a vertical axis, having a mixer complete with a gear motor installed in the axis of the reactor, wherein the interior of said reactor comprises a lower area that can be used for the formation of a polymeric liquid bath and an upper area which can receive a gaseous effluent deriving from the depolymerization of said polymeric liquid bath and having a volume which is less than 20% of the total volume of the interior of the reactor, to reduce the residence time of the gaseous effluent produced inside the reactor, a screw conveyor connected to the base of the reactor and having a discharge head positioned above the level of the polymeric liquid bath present inside the reactor, and a jacket for heating by means of molten salts outside the reactor body, connected to a system for transporting, heating and storing the molten salts.

19. The reactor according to claim 18, wherein the mixer comprises scrapers conformed to the shape of a wall of the reactor and mounted on supports rotating around an axis positioned at a distance of 10-30 cm from the wall of the reactor and maintained with springs limited by stops, wherein the springs bias the scrapers toward the wall and the stops limit the distance of the scrapers from the wall to ensure a desired distance from the wall.

20. A system for depolymerizing plastic material comprising the reactor according to claim 18, and a feeding system, said feeding system comprising at least one screw extruder comprising a system for heating the materials to be extruded, and wherein the screw in an initial screw portion has a broader pitch than the pitch of the screw in a final screw portion of the screw extruder.

21. The reactor according to claim 18, wherein the upper area which can receive a gaseous effluent deriving from the depolymerization of said polymeric liquid bath has a volume which is less than 15% of the total volume of the interior of the reactor.

* * * * *